United States Patent
Kuwata

(10) Patent No.: US 7,831,005 B2
(45) Date of Patent: Nov. 9, 2010

(54) JITTER SUPPRESSION CIRCUIT

(75) Inventor: Naoki Kuwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/898,983

(22) Filed: Sep. 18, 2007

(65) Prior Publication Data

US 2008/0069282 A1      Mar. 20, 2008

Related U.S. Application Data

(63) Continuation of application No. PCT/JP2005/005029, filed on Mar. 18, 2005.

(51) Int. Cl.
*H04L 7/00*  (2006.01)
*H04L 25/00* (2006.01)
*H04L 25/40* (2006.01)

(52) U.S. Cl. .................. 375/371; 398/150; 398/208

(58) Field of Classification Search ........... 398/140, 398/154, 158, 202, 208, 147, 150, 149; 370/395.51; 375/224, 226, 354, 371
See application file for complete search history.

(56) References Cited

U.S. PATENT DOCUMENTS

| | | | |
|---|---|---|---|
| 5,430,773 A | 7/1995 | Marbot | |
| 5,745,525 A * | 4/1998 | Hunsinger et al. | 375/285 |
| 6,704,290 B1 | 3/2004 | Ushirozawa | |
| 2002/0027431 A1* | 3/2002 | Tsuruki | 324/76.53 |
| 2002/0121937 A1* | 9/2002 | Marutani et al. | 331/1 A |
| 2003/0091041 A1* | 5/2003 | Caia | 370/386 |
| 2003/0103302 A1* | 6/2003 | Holman et al. | 361/58 |
| 2004/0087278 A1* | 5/2004 | Lin et al. | 455/73 |
| 2004/0252754 A1* | 12/2004 | Wood et al. | 375/232 |

FOREIGN PATENT DOCUMENTS

| | | |
|---|---|---|
| EP | 0 466 593 | 7/1991 |
| JP | 7-143111 | 6/1995 |
| JP | 2000-286922 | 10/2000 |
| JP | 2003-060732 | 2/2003 |
| JP | 2003-134178 | 5/2003 |
| JP | 2004-172742 | 6/2004 |

* cited by examiner

*Primary Examiner*—David C Payne
*Assistant Examiner*—James M Perez
(74) *Attorney, Agent, or Firm*—Staas & Halsey LLP

(57) ABSTRACT

In a circuit suppressing jitters without a synchronizing clock signal and an increase of a circuit scale, input data is regenerated by a data regeneration circuit in a broadband, a predetermined signal pattern which generates phase deviations exceeding a predetermined value is detected from the data regenerated by the data regeneration circuit by a pattern detection circuit, a reverse phase deviation signal having reverse phase deviations of phase deviations corresponding to the predetermined signal pattern is generated by a reverse phase deviation generating circuit, and an output signal of the data regeneration circuit is canceled by a phase deviation correcting circuit with the reverse phase deviation signal.

14 Claims, 7 Drawing Sheets

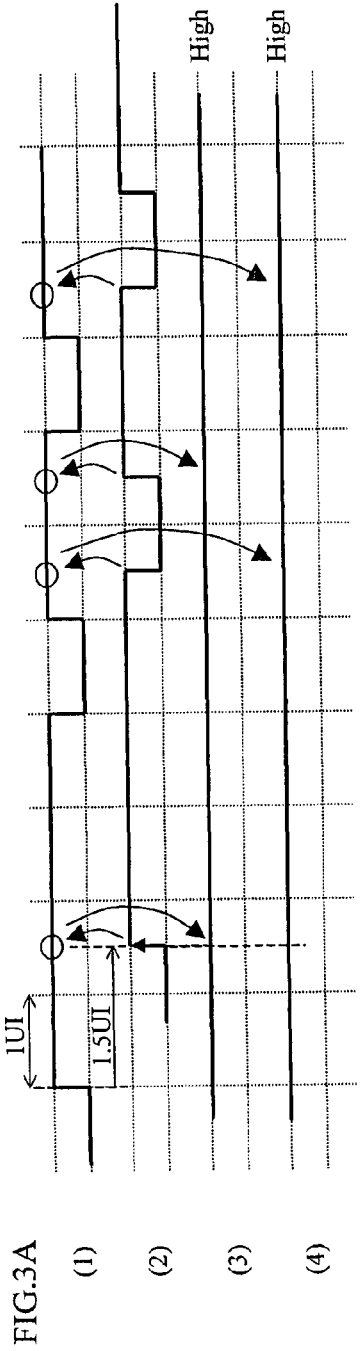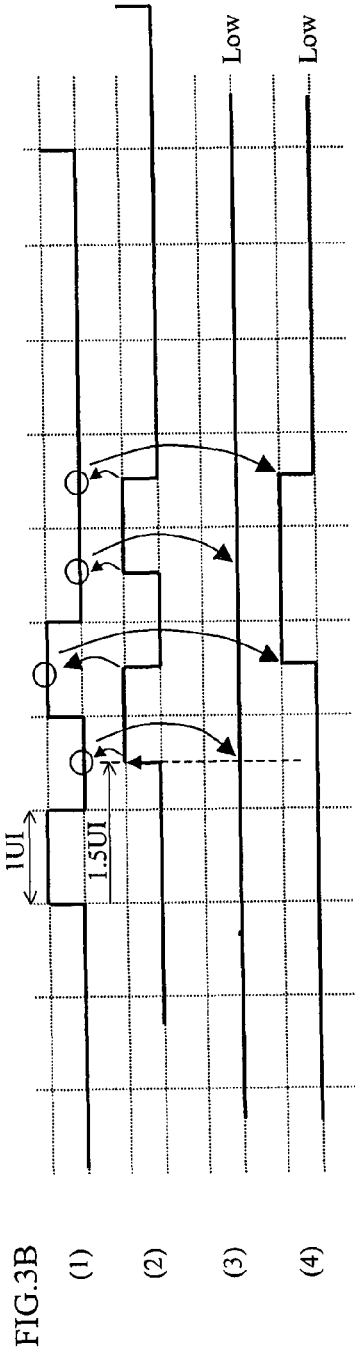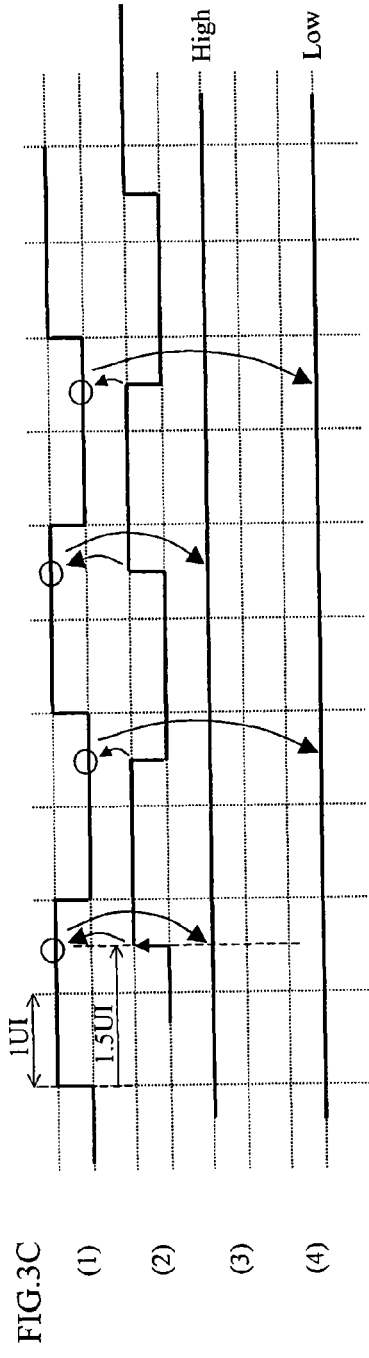

FIG.5A
PRIOR ART
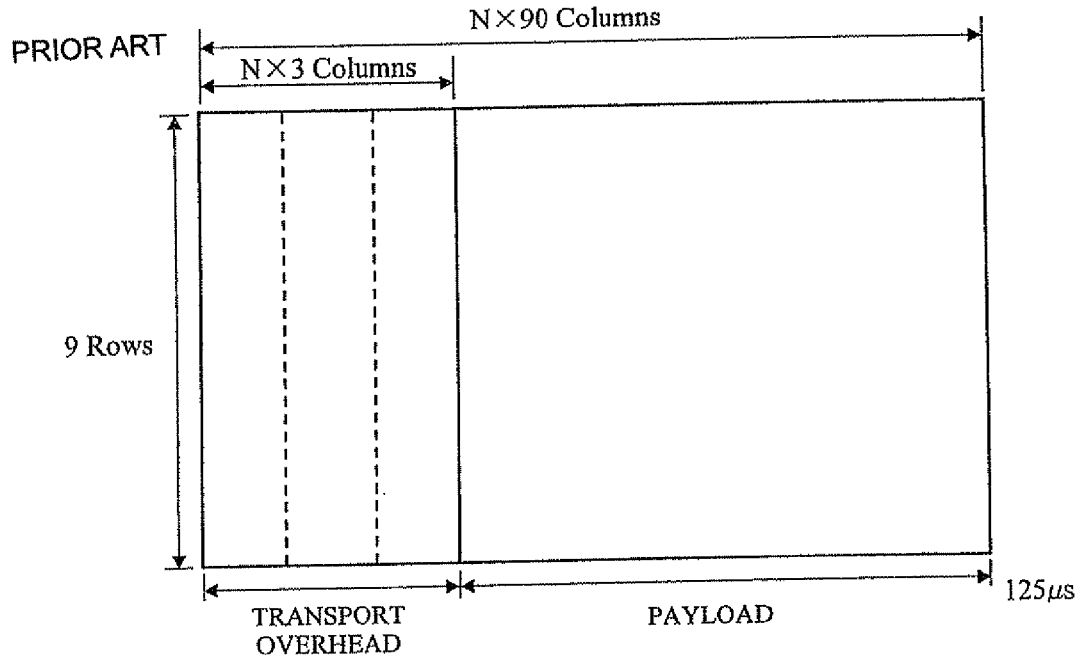
FIG.5B
PRIOR ART
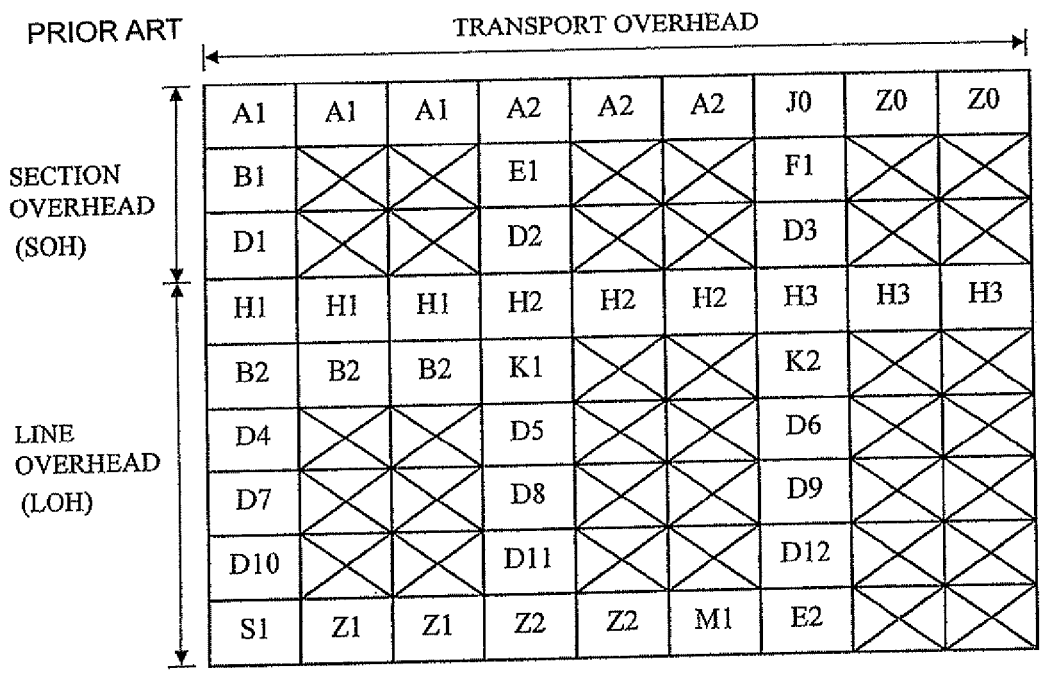
 : ALL-ZERO PATTERN

JITTER SUPPRESSION CIRCUIT

CROSS-REFERENCE TO RELATED APPLICATION

This application is a continuation of International Application PCT/JP2005/005029 filed on Mar. 18, 2005, the contents of which are herein wholly incorporated by reference.

BACKGROUND OF THE INVENTION

1. Field of the Invention

The present invention relates to a jitter suppression circuit, and in particular to a jitter suppression circuit for suppressing jitter components which occur when an optical output signal is provided from an electric input data signal in an optical transmission circuit.

2. Description of the Related Art

An optical transmission circuit, in which it is required to provide a high-quality and stable optical signal independently of a waveform or the like of an electric input data signal, encounters a problem of jitter components (hereinafter, occasionally referred to as phase deviations) in the electric input data signal. The jitter components will now be briefly described.

FIG. 5A shows a format used for a SONET (Synchronous Optical NETwork) or an SDH (Synchronous Digital Hierarchy). In the case of the SONET, a single STS-N frame is composed of N×90 columns×9 rows, as shown in FIG. 5A, having a transport overhead composed of N×3 columns×9 rows on the left side and a payload of the STS-N frame occupying the other parts.

FIG. 5B shows an enlarged view of the transport overhead when N in FIG. 5A is supposed to be 3 (N=3), where a frame synchronous pattern is formed of A1 bytes and A2 bytes in a section overhead (SOH).

In the case of the SONET signal (or SDH signal) of 10 Gbps which is getting prevalent, N is 192. Accordingly, when the repetition of the fixed synchronous pattern continues for a long time (about 300 ns in total of both A1 bytes and A2 bytes), phase deviations which have occurred in the A1 bytes and the A2 bytes have a frequency component of about 3 MHz. Furthermore, the fixed pattern is repeated similarly for the Z0 bytes, so that the fixed pattern continues for about 460 ns in total.

FIGS. 6A and 6B show effects of such a fixed pattern which continues for a long time.

Namely, upon normal time shown in FIG. 6A, an electric input data signal waveform shown in FIG. 6A(a) shows a state where phase deviations (jitter components) of a header portion (a header portion of the SONET signal (OC-192) in this case) due to the fixed pattern become large like an optical output signal as shown in FIG. 6A(b). Also, when the input waveform deteriorates as shown in FIG. 6B, the electric input data signal waveform shown in FIG. 6B(a) has phase deviations of the header portion further increasing as shown in FIG. 6B(b).

For such phase deviations, SONET prescribes values equal to or less than 0.1 UIpp for the jitter standard. Accordingly, a case where the phase deviations exceed 0.1 UIpp raises a problem.

On the other hand, when the optical signal is outputted based on the input data signal including the jitter components based on such a fixed pattern, an arrangement as shown in FIG. 7A has been hitherto known where a high-quality synchronizing clock signal CLKs synchronized with the input data signal is transferred by a D-FF (Flip Flop) 7 and the data signal regenerated by the D-FF 7 is passed through a driving circuit 5 and an optical modulator 6 to generate an output optical signal Os. Thus, it is possible to generate the output optical signal Os from an input data signal Es without being affected by the jitter components.

However, in a recent optical communication module, transferring the synchronizing clock signal CLKs as shown in FIG. 6A tends to be omitted because of thorough downsizing, simplification of an interface, and the like. Accordingly, in the absence of such a synchronizing clock, jitter components of the input data signal are not suppressed and so transferred to the optical signal, so that the jitter components of the output optical signal increase as shown in FIG. 6B.

As an example not using such a synchronizing clock signal, another prior art shown in FIG. 7B has been known. In this prior art, firstly in order to remove the jitter components included in the input data signal Es to some extent, the input data signal Es is passed through a broadband CDR (Clock & Data Recovery) circuit 1, and a clock CLK of a bit rate of the input data signal is extracted in an installed PLL circuit (not shown). Also, the jitter components are filtered by a broadband lowpass filter of about 8 MHz within the PLL circuit, so that data DATA is regenerated. It is to be noted that setting to a narrow band can not be achieved in this case because the regenerated data may have an error due to a clock extracted by a narrowband PLL circuit when the input data signal Es with the jitter components is tapped or sampled.

Namely, in order to avoid a code error occurrence, there is a limit of the suppression of the jitter components included in the input signal. In the SONET standard, even if a signal with 1.5 UIpp jitters is inputted e.g. at a frequency of 400 kHz, code errors must not be generated. If jitter components of 400 kHz are completely suppressed, the code errors occur as for the signal with the jitter components exceeding 1 UI without fail. Accordingly, it is required to transmit jitters to some extent without suppression, so that the CDR circuit 1 normally has a broadband of about 8 MHz.

On the other hand, if a transparent bandwidth of jitters is about 8 MHz, jitter components of about 3 MHz which occur at A1 and A2 bytes can not be suppressed, so that the output signal is to hold the jitter components.

Therefore, the data DATA and the clock CLK thus outputted from the broadband CDR circuit 1 are transmitted to an FIFO 8 composed of plural stages of shift registers, and the clock CLK is also transmitted to a narrowband PLL circuit 9.

The narrowband PLL circuit 9, in response to the clock CLK, passes the jitter components through a lowpass filter (not shown) of e.g. 100 KHz to generate a read clock of the above-mentioned bit rate, by which the data DATA stored in the FIFO 8 is re-tapped, whereby the output optical signal Os with few jitter components is generated through the driving circuit 5 and the optical modulator 6.

On the other hand, there is a data transmission rate determining device which synchronizes a reception timing of data transmitted from other data transmitters/receivers at a synchronous circuit based on a transmission rate of data determined by a determining portion, and which processes the data received by using the synchronous circuit at a processing circuit (see e.g. patent document 1).

Also, there is a transmission rate detection circuit detecting each transmission rate of a synchronous transfer mode (STM-M) corresponding to the SDH (see e.g. patent document 2).

Furthermore, there is a circuit which detects normalized phase jitters, predicts subsequent phase jitters from the detected phase jitters, and predicts subsequent phase jitters by averaging to the detected phase jitters (see e.g. patent document 3).

[Patent Document 1] Japanese Patent Application Laid-open No. 2003-60732

[Patent Document 2] Japanese Patent Application Laid-open No. 2000-286922

[Patent Document 3] Japanese Patent Application Laid-open No. 2003-134178

While the prior art shown in FIG. 7A requires the synchronizing clock signal, the prior art shown in FIG. 7B, which suppresses the jitter components without the synchronizing clock signal, has to use the narrowband PLL circuit and the FIFO.

Namely, in the latter case, a VCO (voltage controlled oscillator) used for the narrowband PLL circuit 9 is inevitably attached as an external part, resulting in a problem that a circuit scale grows.

SUMMARY OF THE INVENTION

It is accordingly an object of the present invention to provide a circuit which suppresses jitters without a synchronizing clock signal and a growth of a circuit scale.

In order to achieve the above-mentioned object, a jitter suppression circuit according to the present invention comprises: a data regeneration circuit regenerating input data; a pattern detection circuit detecting a predetermined signal pattern which generates phase deviations exceeding a predetermined value, from the data regenerated by the data regeneration circuit; a reverse phase deviation generating circuit generating, when the predetermined signal pattern is detected, a reverse phase deviation signal having reverse phase deviations of the phase deviations corresponding to the predetermined signal pattern; and a phase deviation correcting circuit canceling a phase deviation of an output signal of the data regeneration circuit with the reverse phase deviation signal.

Namely in the present invention, as schematically shown in FIG. 1, a regenerated data signal from which jitter components are removed to some extent by a broadband CDR circuit 1 is provided to a pattern detection circuit 2 and a phase deviation correcting circuit 4. The pattern detection circuit 2 detects a predetermined signal pattern (e.g. patterns in A1, A2, and Z0 bytes of SONET header or SDH header) which generates phase deviations exceeding a predetermined value from the data regenerated by the broadband CDR circuit 1.

A reverse phase deviation generating circuit 3 generates a reverse phase deviation signal with reverse phase deviations canceling phase deviation components (Jitter components) in the data signal outputted from the broadband CDR circuit 1 based on the predetermined signal pattern detected by the pattern detection circuit 2. The phase deviation correcting circuit 4, based on the reverse phase deviation signal having received from the reverse phase deviation generating circuit 3, cancels the phase deviation components in the data signal outputted from the broadband CDR circuit 1.

Thus, in the phase deviation correcting circuit 4, phase deviations A-C pointed out by arrows in FIG. 1 are removed, so that the jitter components based on the predetermined signal pattern are removed from the optical signal Os outputted through the driving circuit 5 and the optical modulator 6.

The above-mentioned pattern detection circuit, for example, determines or judges the data regenerated by the data regeneration circuit with data obtained by delaying the regenerated data by a predetermined time and inverted data of the delayed data being made clocks, thereby acquiring two types of determined data and detecting the patterns in the A1, A2, and Z0 bytes based on the determined data.

Also, the above-mentioned data regeneration circuit, for example, has a broadband lowpass filter for phase deviation components of the input data, and the pattern detection circuit averages, upon acquiring the determined data, the output signal by a lowpass filter having a cutoff frequency set at a frequency higher than the data regeneration circuit.

Also, the input data, for example, comprises transmitting input data or receiving input data.

Also, the pattern detection circuit, for example, performs ternary discrimination and combination of the two types of determined data, thereby detecting the patterns in the A1, A2, and Z0 bytes.

Also, the reverse phase deviation generating circuit, for example, provides the reverse phase deviation signal to the phase deviation correcting circuit after having been passed through a lowpass filter having a cutoff frequency set at a frequency equivalent to the data regeneration circuit.

According to the present invention, it becomes possible to make a synchronizing clock signal unnecessary and to suppress the jitter components within a jitter transfer bandwidth which could not be suppressed only by the broadband CDR circuit. Also, it becomes possible to perform the jitter suppression with an extremely small scale circuit and a sufficient accuracy in a header portion detection by a frame synchronous circuit used in a SONET framer circuit or the like, thereby being mounted on a compact optical transceiver such as an XFP module.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 3A-3C are operation time charts of an embodiment of a jitter suppression circuit according to the present invention shown in FIG. 2;

FIGS. 5A and 5B are format diagrams of a SONET or an SDH generally known;

DESCRIPTION OF THE EMBODIMENTS

Figure 1:
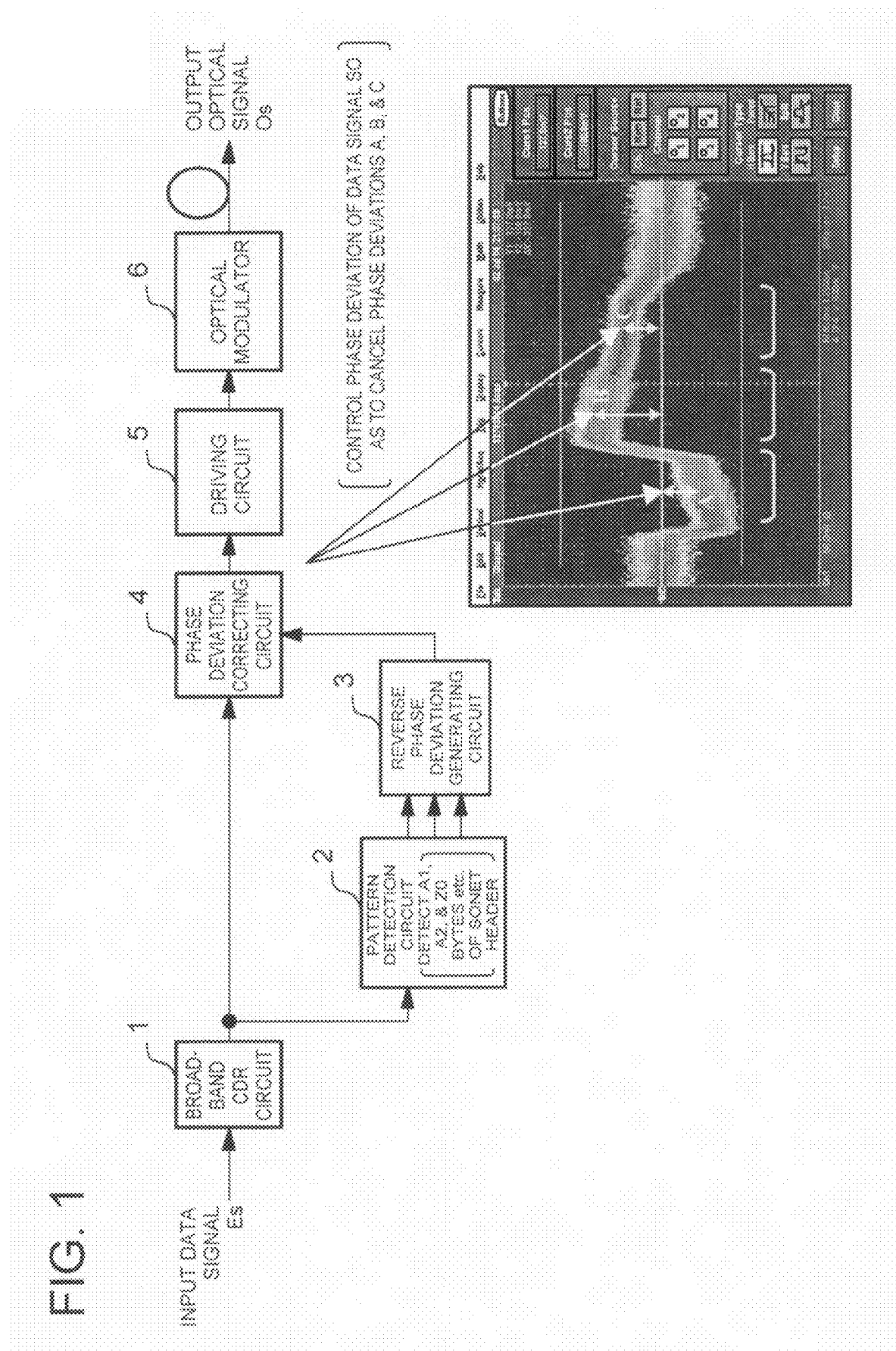
FIG. 1 is a block diagram showing a concept of a jitter suppression circuit according to the present invention.
Figure 2:
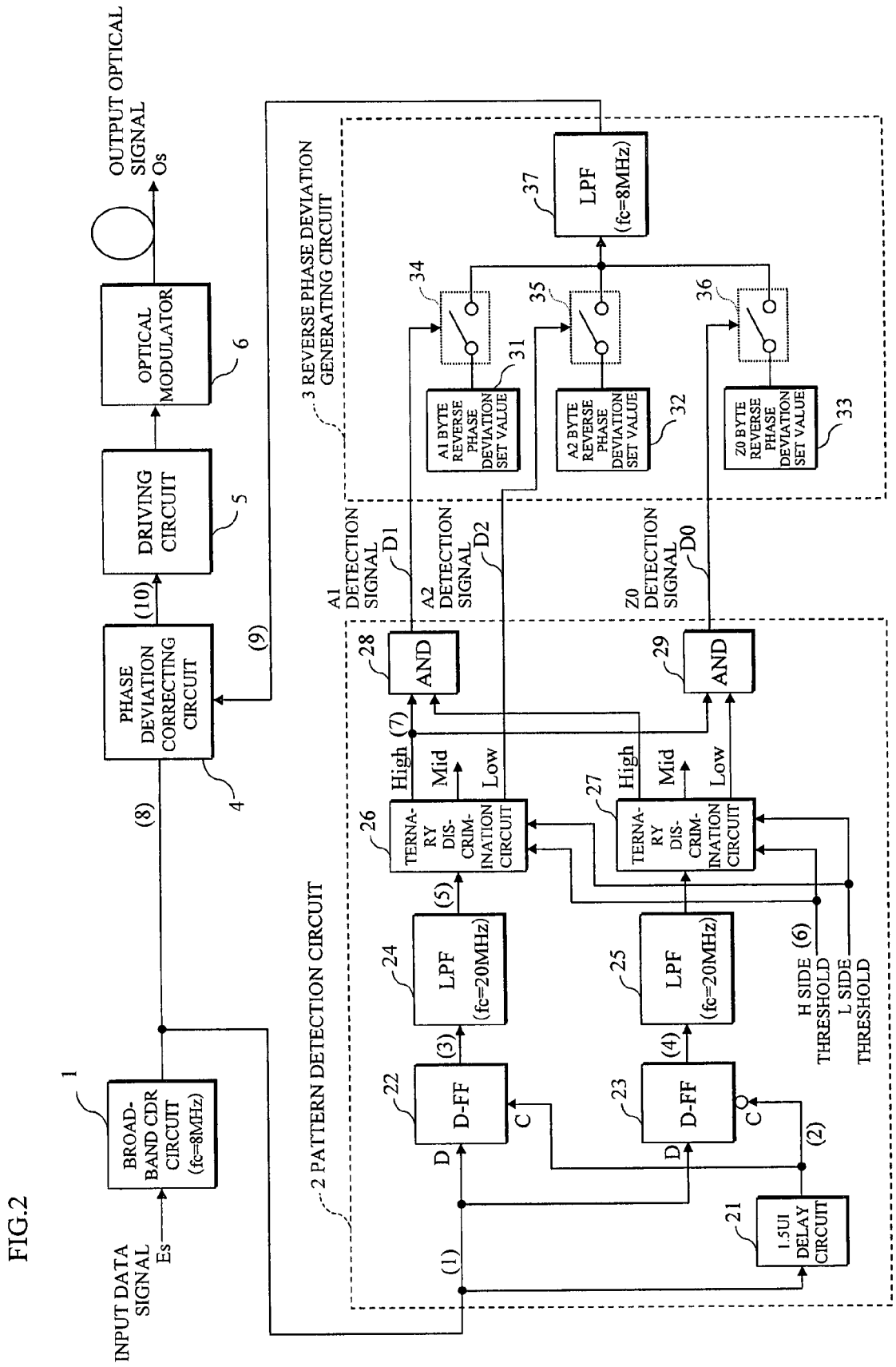
FIG. 2 is a block diagram showing one embodiment of a jitter suppression circuit according to the present invention.

FIG. 2 shows one embodiment of the jitter suppression circuit according to the present invention conceptually shown in FIG. 1, and in particular shows a specific arrangement of the pattern detection circuit 2 and the reverse phase deviation generating circuit 3.

Pattern Detection Circuit 2

Firstly, the pattern detection circuit 2 is schematically composed of a 1.5 UI (Unit Interval) delay circuit 21, two D-FFs 22 and 23, two lowpass filters (LPFs) 24 and 25, two ternary discrimination circuits 26 and 27, and two AND gates 28 and 29.

In this pattern detection circuit 2, output data (1) of the broadband CDR circuit 1 is commonly provided to the 1.5 UI delay circuit 21 and the D-FFs 22 and 23. The 1.5 UI delay circuit 21 provides, after having delayed the output data of the broadband CDR circuit 1 by the period of 1.5 times a clock period, the output data as it is to the D-FF 22 as a clock signal (2), and provides to the D-FF 23 the clock signal (2) in the inverted form.

The D-FFs 22 and 23 respectively provide output data (3) and (4) to the lowpass filters 24 and 25 (cutoff frequency: 20 MHz), the lowpass filter 24 provides an output signal (5) to the ternary discrimination circuit 26, and the lowpass filter 25 provides the output signal to the ternary discrimination circuit 27.

An H side threshold (6) and an L side threshold are both provided to the ternary discrimination circuits 26 and 27. An H side output (High) (7) of the ternary discrimination circuit 26 is commonly transmitted to the AND gates 28 and 29, and an L side output is transmitted as it is to the reverse phase deviation generating circuit 3 as an A2 detection signal D2. Also, an H side output of the ternary discrimination circuit 27 is transmitted to the AND gate 28, and an L side (Low) output is transmitted to the AND gate 29. It is to be noted that an intermediate output (Mid) indicates an intermediate level between the H side output and the L side output, which is not particularly used.

The AND gate 28 takes logical product (AND) between the H side output (7) of the ternary discrimination circuit 26 and the H side output of the ternary discrimination circuit 27 to generate an A1 detection signal D1, which is transmitted to the reverse phase deviation generating circuit 3. Also, the AND gate 29 is connected so as to take logical product between the H side output (7) of the ternary discrimination circuit 26 and the L side output of the ternary discrimination circuit 27, which is transmitted to the reverse phase deviation generating circuit 3 as a Z0 detection circuit D0.

Reverse Phase Deviation Generating Circuit 3

The reverse phase deviation generating circuit 3 is provided with a reverse phase deviation set value 31 in which reverse phase deviations for canceling phase deviations corresponding to A1 byte in the SONET or SDH are preset, a reverse phase deviation set value 32 corresponding to A2 byte, and a reverse phase deviation set value 33 corresponding to Z0 byte.

These set values 31-33 are respectively transmitted to switches 34-36. The switch 34-36 are arranged such that the switch 34 is closed when the A1 detection signal D1 from the AND gate 28 in the pattern detection circuit 2 is received, the switch 35 is closed similarly when the L side output of the ternary discrimination circuit 26 in the pattern detection circuit 2 is transmitted, and furthermore the switch 36 is closed when the Z0 detection signal D0 from the AND gate 29 in the pattern detection circuit 2 is generated.

Also, the switches 34-36 are connected such that the reverse phase deviation signals generated from any one of the switches 34-36 are transmitted to the phase deviation correcting circuit 4 through a lowpass filter (cutoff frequency: 8 MHz) 37.

Hereinafter, the operation of this embodiment will be described referring to time charts shown in FIGS. 3A-3C and operation waveform diagrams shown in FIGS. 4A and 4B.

At the Time of A1 Input

Firstly, when a header of the input data signal Es indicates the A1 byte, as shown in FIG. 3A, the output signal (1) of the broadband CDR1 has a repeated pattern of "11110110" as shown in FIG. 3A(1). The 1.5 UI delay circuit 21 having received the signal generates data obtained by delaying the data of the received signal by 1.5 UI as shown in FIG. 3A(2), the data is provided to the D-FF 22 as it is, and the data inverted is provided to the D-FF 23.

In the D-FF 22 having received the output signal (2) from the 1.5 UI delay circuit 21, as shown in FIG. 3A(3), the output signal (1) is tapped at a rise of the output signal (2) of the 1.5 UI delay circuit 21. Therefore, as for the output signal of the D-FF 22, an "H" level signal is constantly provided to the lowpass filter 24 as shown in FIG. 3A(3). Also, in the D-FF 23, the data signal shown in FIG. 3A(1) is tapped by a fall of the output signal from the 1.5 UI delay circuit 21 shown in FIG. 3A(2), so that as shown in FIG. 3A(4) the "H" level signal is also constantly outputted and provided to the lowpass filter 25.

Accordingly, the ternary discrimination circuit 26 performs, based on the H side threshold (6) and the L side threshold, discrimination of an output (5) of the lowpass filter 24 between the "H" level, the "M" (intermediate) level, and the "L" level. In the case of FIG. 3A, an "H" level signal (7) is provided to the AND gate 28. Similarly, after the "H" level signal outputted from the D-FF 23 is passed through the lowpass filter 25 and compared with the H side threshold and the L side threshold in the ternary discrimination circuit 27, the "H" level signal is transmitted to the AND gate 28 in the same way as the ternary discrimination circuit 26.

Accordingly, the A1 detection signal D1 is outputted only from the AND gate 28 and transmitted to the switch 34 of the reverse phase deviation generating circuit 3.

At the Time of A2 Input

When the A2 byte of the header is inputted, as shown in FIG. 3B(1), the pattern of "00101000" is repeated. In the 1.5 UI delay circuit 21, as shown in FIG. 3B(2), the output signal (4) is delayed by 1.5 UI and provided to the D-FF 22 as it is as the clock signal, and the signal is provided in the inverted form to the D-FF 23 as the clock signal.

As a result, as shown in FIG. 3B(3), the output signal of the D-FF 22 constantly becomes the "L" level. As for the output signal of the D-FF 23, as shown in FIG. 3B(4), the output signal is generated which becomes partially the "H" level.

Accordingly, in the lowpass filter 24, the "L" level signal shown in FIG. 3B(3) is provided to the ternary discrimination circuit 26 as it is, and compared with the H side threshold and the L side threshold, with the result that the "L" level signal, i.e. the A2 detection signal D2 is generated. The signal shown in FIG. 3B(4) is provided to the ternary discrimination circuit 27 from the D-FF 23 through the lowpass filter 25. As a result, the signal is averaged by the lowpass filter 25, and the "M" level signal is outputted. Since this output signal is neither transmitted to the AND gates 28 nor 29, the L side output of the ternary discrimination circuit only becomes the determination result concerning the A2 detection signal D2 to be provided to the switch 35 in the reverse phase deviation generating circuit 3.

At the Time of Z0 Input

When the Z0 byte of the header is inputted, as shown in FIG. 3C(1), the pattern of "11001100" is repeated. The signal delayed through the 1.5 UI delay circuit 25 becomes a signal as shown in FIG. 3C(2). The signal is provided to the D-FF 22 as it is as the clock signal, and the signal is provided in the inverted form to the D-FF 23 as the clock signal. Accordingly, the "H" level signal is constantly generated from the D-FF 22 as shown in FIG. 3C(3), and the "L" level signal is constantly generated as shown in FIG. 3C(4) from the D-FF 23.

Accordingly, in the ternary discrimination circuits 26 and 27 having received the signals through the lowpass filters 24 and 25, the ternary discrimination circuit 26 indicates the "H" output (7), and the ternary discrimination circuit 27 indicates the "L" level, so that only the AND gate 29 satisfies the condition of the logical product, thereby generating the Z0 detection signal D0 to be provided to the switch 36 of the reverse phase deviation generating circuit 3.

Figure 4A:
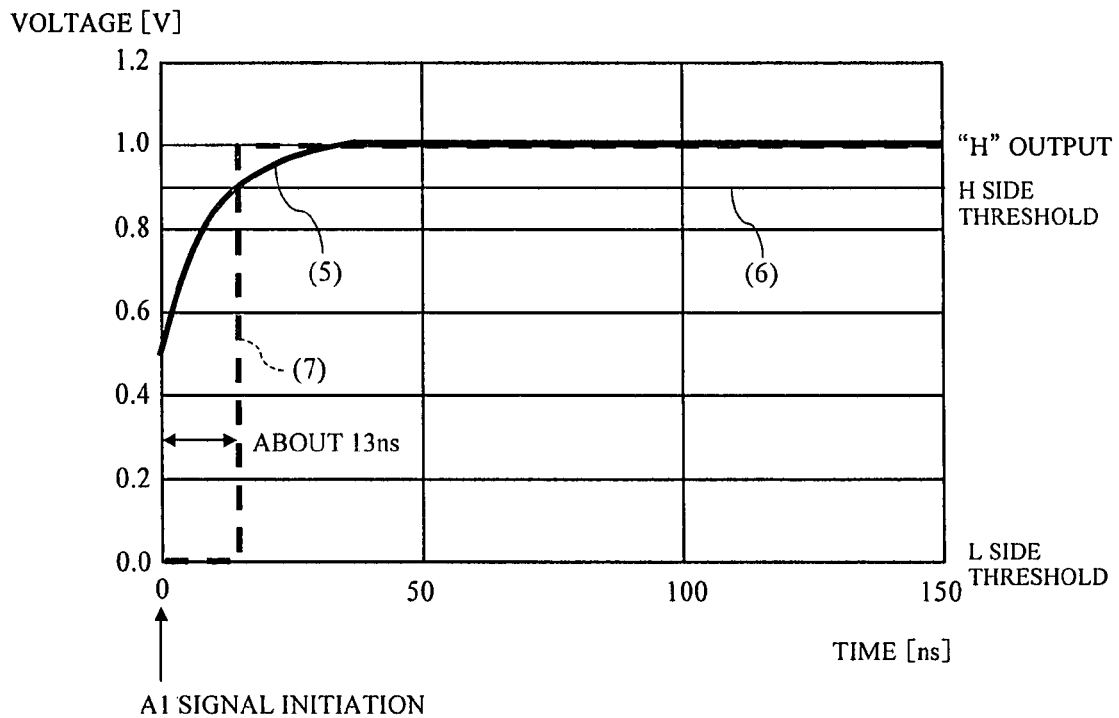
FIGS. 4A and 4B are operation waveform diagrams of an embodiment of a jitter suppression circuit according to the present invention shown in FIG. 2.

FIG. 4A shows an operation waveform diagram in the case of detecting the A1 signal in the pattern detection circuit 2. Namely, it is indicated that the H side output (7) becomes "H" when the signal (5) outputted from the lowpass filter 24 exceeds the H side threshold (6) provided to the ternary discrimination circuit 26. While it is indicated that the time until the signal (5) exceeds the H side threshold (6) is about 13 ns, this "13 ns" corresponds to 130 bits, and a probability of detecting the A1 in error is about once in 100 years, so that it is set so as not to cause a problem of an erroneous detection.

Figure 4B:
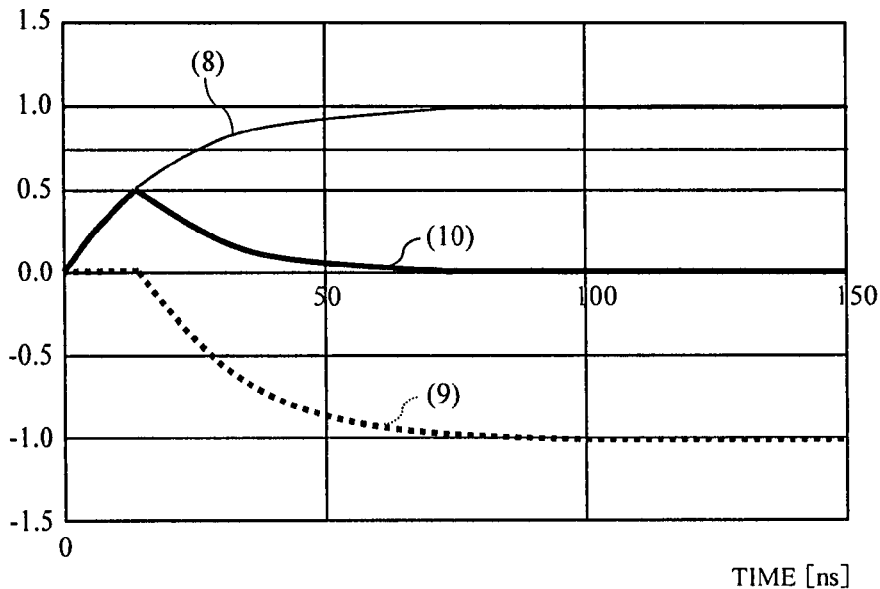
Figures 6A, 6B:
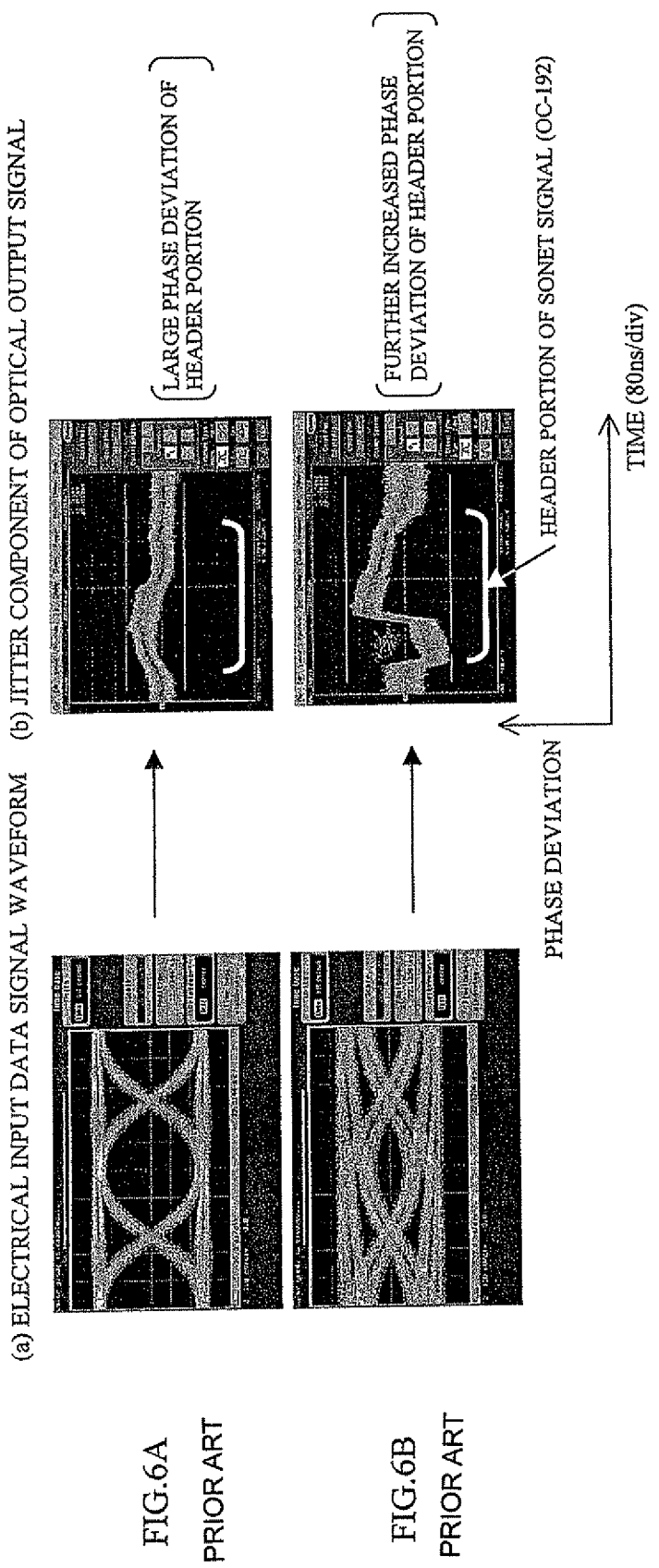
FIGS. 6A and 6B are diagrams for illustrating jitter components which occur due to a synchronizing pattern signal.
Figure 7A:
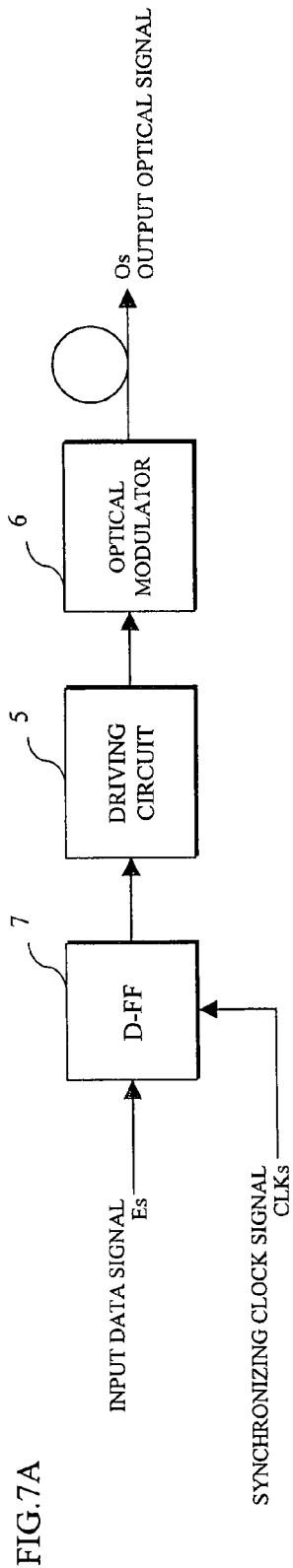
FIGS. 7A and 7B are block diagrams showing prior arts.
Figure 7B:
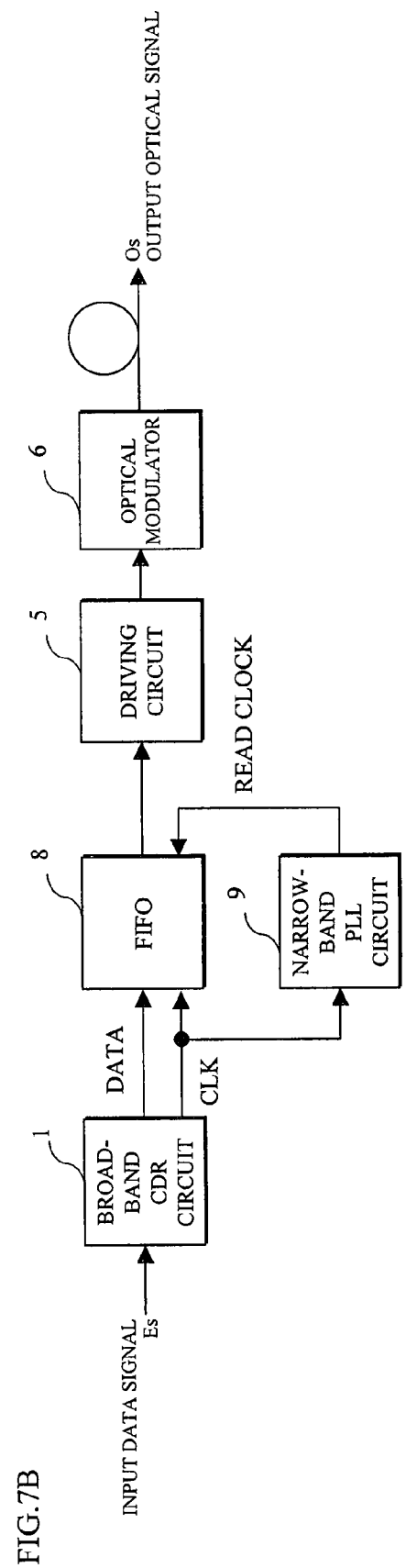

FIG. 4B shows a combination of operations of the reverse phase deviation generating circuit 3 and the phase deviation correcting circuit 4.

This example also indicates the A1 byte. In the A1 byte reverse phase deviation set value 31, a phase deviation correction quantity of A1 byte is preliminarily stored. When the A1 detection signal D1 from the pattern detection circuit 2 is provided to the switch 34, the A1 byte reverse phase deviation set value 31 is outputted. This output signal is averaged by the lowpass filter 37 to be provided to the phase deviation correcting circuit 4 as a signal having a dotted line waveform (9) shown in FIG. 4B.

The phase deviation correcting circuit 4 receives the output signal (8) from the broadband CDR circuit 1, and the signal (8) is added to the output signal (9) from the lowpass filter 37, so that a correction signal as shown by a thick line output signal (10) is outputted from the phase deviation correcting circuit 4.

Thus, the signal (8) including the jitter components is gradually reduced from, as the maximum value, 0.5 (at a time delayed by about 13 ns from A1 byte start) in the phase deviations (normalized with A1 byte maximum phase deviations) by the correction signal (9) from the reverse phase deviation generating circuit 3. Therefore, it becomes possible to keep the influence of the jitter components by the A1 byte extremely low.

In the example of FIGS. 4A and 4B, the jitters are reduced to half by the jitter correction. For example, when the jitter components of 0.15 UIpp arise without the correction, the jitter components can be suppressed to 0.075 UIpp by the correction, so that the above-mentioned SONET standard, i.e. less than 0.1 UIpp can be satisfied.

It is to be noted that the cutoff frequency in the lowpass filters 24 and 25 is set so that the jitter components may be reduced to half in a bandwidth approximately three times that of the CDR in the broadband CDR circuit. Also, the cutoff frequency of the lowpass filter 37 is set in conformity with the cutoff frequency of the broadband CDR circuit 1.

While it becomes possible to detect the jitter components in a short time by widening the bandwidth of the lowpass filters 24 and 25, conversely the probability of false detections increases, so that there is a possibility that corrections will be excessively performed despite of no occurrence of jitter components. Also, a transitional correction quantity can be controlled in the bandwidth of the lowpass filter 37. However, an excessive bandwidth causes an excess correction while a narrow bandwidth causes an insufficient correction, which makes the reduction of the jitter components difficult.

While the jitter correction quantity is thus changed as an operation reference of the jitter correction is changed, the above-mentioned embodiment uses the above cutoff frequency for the lowpass filters as an optimum one providing an operation effect of FIGS. 4A and 4B.

While the above-mentioned description uses the expression of jitters or phase deviations, it is needless to say that an expression of "delay" on a time basis can be equivalently used.

Furthermore, while the transmission circuit is exemplified in the above-mentioned embodiment, the present invention can be also applied to a reception circuit.

What is claimed is:

1. A jitter suppression circuit comprising:
    a data regeneration circuit regenerating input data in order to remove, to some extent, jitter components included in the input data;
    a pattern detection circuit detecting a predetermined signal pattern from the data regenerated by the data regeneration circuit;
    a reverse phase deviation generating circuit generating, when the predetermined signal pattern is detected, a reverse phase deviation signal having reverse phase deviations as jitter components corresponding to the predetermined signal pattern; and
    a phase deviation correcting circuit canceling a phase deviation as a jitter component of an output signal of the data regeneration circuit with the reverse phase deviation signal
    wherein the predetermined signal pattern comprises patterns in A1, A2, and Z0 bytes of a SONET header or an SDH header,
    wherein the pattern detection circuit determines the data regenerated by the data regeneration circuit with data obtained by delaying the regenerated data by a predetermined time and inverted data of the delayed data being made clocks, thereby acquiring two types of determined data and detecting the patterns in the A1, A2, and Z0 bytes based on the determined data.

2. The jitter suppression circuit as claimed in claim 1, wherein the input data comprises transmitting input data or receiving input data.

3. The jitter suppression circuit as claimed in claim 2, further comprising a circuit converting the output of the phase deviation correcting circuit into an optical signal.

4. The jitter suppression circuit as claimed in claim 2, wherein the reverse phase deviation generating circuit provides the reverse phase deviation signal to the phase deviation correcting circuit after having been passed through a lowpass filter having a cutoff frequency set at a frequency equivalent to the data regeneration circuit.

5. The jitter suppression circuit as claimed in claim 1, wherein the reverse phase deviation generating circuit provides the reverse phase deviation signal to the phase deviation correcting circuit after having been passed through a lowpass filter having a cutoff frequency set at a frequency equivalent to the data regeneration circuit.

6. The jitter suppression circuit as claimed in claim 5, further comprising a circuit converting the output of the phase deviation correcting circuit into an optical signal.

7. The jitter suppression circuit as claimed in claim 1, further comprising a circuit converting the output of the phase deviation correcting circuit into an optical signal.

8. A jitter suppression circuit comprising:
    a data regeneration circuit regenerating input data;
    a pattern detection circuit detecting a predetermined signal pattern, which is composed of a plurality of bytes, from the data regenerated by the data regeneration circuit;
    a reverse phase deviation generating circuit generating, when the predetermined signal pattern is detected, a reverse phase deviation signal having reverse phase deviations of phase deviations corresponding to the predetermined signal pattern; and a phase deviation correcting circuit canceling a phase deviation of an output signal of the data regeneration circuit with the reverse phase deviation signal, wherein the predetermined signal pattern comprises patterns in A1, A2, and Z0 bytes of a SONET header or an SDH header, wherein the pattern detection circuit determines the data regenerated by the data regeneration circuit with data obtained by delaying the regenerated data by a predetermined time and inverted data of the delayed data being made clocks, thereby acquiring two types of determined data and detecting the patterns in the A1, A2, and Z0 bytes based on the determined data, and wherein the data regeneration circuit has a broadband lowpass filter for phase deviation components of the input data, and the pattern detection circuit averages, upon acquiring the determined data, the output signal by a lowpass filter having a cutoff frequency set at a frequency higher than the data regeneration circuit.

9. The jitter suppression circuit as claimed in claim 8, wherein the pattern detection circuit performs ternary discrimination and combination of the two types of determined data, thereby detecting the patterns in the A1, A2, and Z0 bytes.

10. The jitter suppression circuit as claimed in claim 9, further comprising a circuit converting the output of the phase deviation correcting circuit into an optical signal.

11. The jitter suppression circuit as claimed in claim 9, wherein the reverse phase deviation generating circuit provides the reverse phase deviation signal to the phase deviation correcting circuit after having been passed through a lowpass filter having a cutoff frequency set at a frequency equivalent to the data regeneration circuit.

12. The jitter suppression circuit as claimed in claim 8, wherein the reverse phase deviation generating circuit provides the reverse phase deviation signal to the phase deviation correcting circuit after having been passed through a lowpass filter having a cutoff frequency set at a frequency equivalent to the data regeneration circuit.

13. The jitter suppression circuit as claimed in claim 8, further comprising a circuit converting the output of the phase deviation correcting circuit into an optical signal.

14. A jitter suppression circuit comprising:

a data regeneration circuit regenerating input data;

a pattern detection circuit detecting a predetermined signal pattern, which is composed of a plurality of bytes, from the data regenerated by the data regeneration circuit;

a reverse phase deviation generating circuit generating, when the predetermined signal pattern is detected, a reverse phase deviation signal having reverse phase deviations of phase deviations corresponding to the predetermined signal pattern; and a phase deviation correcting circuit canceling a phase deviation of an output signal of the data regeneration circuit with the reverse phase deviation signal, wherein the predetermined signal pattern comprises patterns in A1, A2, and Z0 bytes of a SONET header or an SDH header, wherein the pattern detection circuit determines the data regenerated by the data regeneration circuit with data obtained by delaying the regenerated data by a predetermined time and inverted data of the delayed data being made clocks, thereby acquiring two types of determined data and detecting the patterns in the A1, A2, and Z0 bytes based on the determined data, and wherein the reverse phase deviation generating circuit provides the reverse phase deviation signal to the phase deviation correcting circuit after having been passed through a lowpass filter having a cutoff frequency set at a frequency equivalent to the data regeneration circuit.

* * * * *